United States Patent
Boehm

(10) Patent No.: US 7,185,947 B2
(45) Date of Patent: Mar. 6, 2007

(54) WALL STRUCTURE AND METHOD FOR THE PRODUCTION THEREOF

(75) Inventor: Markus Boehm, Geggenau (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 10/538,429

(22) PCT Filed: Dec. 11, 2003

(86) PCT No.: PCT/EP03/14085

§ 371 (c)(1),
(2), (4) Date: Nov. 25, 2005

(87) PCT Pub. No.: WO2004/052675

PCT Pub. Date: Jun. 24, 2004

(65) Prior Publication Data

US 2006/0131933 A1 Jun. 22, 2006

(30) Foreign Application Priority Data

Dec. 11, 2002 (DE) ................. 102 58 705

(51) Int. Cl.
*B60J 7/00* (2006.01)
(52) U.S. Cl. ................... 296/208; 296/211
(58) Field of Classification Search ........... 296/208, 296/218.6, 39.3, 211, 24.34; 428/215, 523, 428/349; 52/540, 557, 554, 535
See application file for complete search history.

(56) References Cited

U.S. PATENT DOCUMENTS

| | | | |
|---|---|---|---|
| 5,022,943 A * | 6/1991 | Zaima ................... | 428/116 |
| 5,709,925 A * | 1/1998 | Spengler et al. ........ | 428/198 |
| 5,802,984 A * | 9/1998 | Thoman et al. ......... | 105/404 |
| 5,967,598 A | 10/1999 | Eilemann et al. | |
| 6,110,037 A | 8/2000 | Yoshinaka | |
| 6,217,438 B1 | 4/2001 | Dausch | |
| 6,561,562 B1 * | 5/2003 | Hesch ................... | 296/208 |
| 6,923,497 B2 * | 8/2005 | Umebayashi ........... | 296/208 |
| 7,128,365 B2 * | 10/2006 | Kiesewetter et al. .... | 296/210 |
| 7,128,366 B2 * | 10/2006 | Russell .................. | 296/211 |
| 2002/0145309 A1 * | 10/2002 | Shikata et al. .......... | 296/208 |
| 2006/0169481 A1 * | 8/2006 | Stotz .................... | 174/117 F |

FOREIGN PATENT DOCUMENTS

| | | |
|---|---|---|
| DE | 3 806 783 | 9/1989 |
| DE | 44 33 016 | 3/1995 |

(Continued)

*Primary Examiner*—Kiran B. Patel
(74) *Attorney, Agent, or Firm*—Fay Kaplun & Marcin, LLP

(57) ABSTRACT

Described is a wall structure used, for example, in the form of an instrument panel in a motor vehicle interior. The wall structure is embodied in the form of a laminated material consisting of a top layer, a hollow layer and a lower layer. The top layer is oriented towards the interior of the motor vehicle, and the hollow layer is arranged near a ventilation system of the motor vehicle so that a heat energy is removed from the top layer or is supplied thereto using an airflow. Described is also a method for producing the wall structure which allows to air-conditioning the interior of the motor vehicle or control the temperature of the surface layers inside thereof with low energy consumption and in a quick manner.

16 Claims, 3 Drawing Sheets

FOREIGN PATENT DOCUMENTS

| | | |
|---|---|---|
| DE | 196 54 246 | 6/1998 |
| DE | 198 22 113 | 9/1999 |
| DE | 100 60 537 | 6/2002 |
| DE | 100 61 430 | 6/2002 |
| DE | 101 25 074 | 11/2002 |
| DE | 101 35 613 | 2/2003 |
| WO | 02 / 38411 | 5/2002 |

* cited by examiner

WALL STRUCTURE AND METHOD FOR THE PRODUCTION THEREOF

FIELD OF THE INVENTION

The present invention relates to a wall structure as well as to a method for manufacturing same.

Such a wall structure suggests itself in particular for control panels for the interiors of automotive vehicles. Known control panels are normally produced from a relatively solid synthetic support, to the driver's side of which a foam layer is attached which is covered by a decorative layer, to guarantee better haptics or safety.

BACKGROUND INFORMATION

Particularly in the case of strong sunshine, there is the problem that the usually dark (often black) decorative surface of the control panel becomes very hot. This can even lead to occupants being burnt when they touch it; moreover this produces a very high air temperature in the vehicle interior.

To alleviate these problems it has been proposed to provide, for example, air-conditioning systems which function in a stationary vehicle and are operated e.g. via solar cells in the sliding roof, in order in this way to achieve cooling of the vehicle interior as well as of the decorative surfaces.

However what is disadvantageous about this is that for this kind of cooling the air-conditioning system has to be very bulky in order to achieve effective cooling, particularly of the decorative surfaces.

SUMMARY OF THE INVENTION

The present invention relates to a wall structure and a method for producing same, which allows a more efficient control of the temperature of a decorative surface or of the vehicle interior.

Because the wall structure according to the invention comprises an arrangement in layers of top layer, hollow layer and bottom layer, the top layer being oriented towards the vehicle interior and the hollow layer being so connected to a ventilation system that heat energy may be removed from the top layer or supplied to same by means of the air-flow, this object is accomplished.

In this way, the temperature in the top layer, in particular on the sides of the top layer which face a vehicle interior, can be controlled particularly efficiently. It is not necessary, as with conventional ventilation systems, to achieve "direct" cooling or heating of the top layer via cooling or heating the air in the entire vehicle interior. Instead of this, by direct connection of the hollow layer through which warm or cold air flows, temperature control is achieved over a much greater surface and is therefore much more rapid or efficient. This can lead to a noticeable increase or reduction in the temperature of the top layer after only a few seconds of air circulation. Thus for example it is also conceivable that, when the vehicle is opened by remote control, the ventilation system is activated and, since the cooling for example occurs very rapidly, when the control panel is first touched by a vehicle occupant, cooling of the top layer has taken place to the extent that a burn can be excluded.

The corresponding manufacturing method claim provides for the bottom and top layers to be interconnected at a spacing from one another in such a way that between these layers a hollow layer remains for air conduction which can be connected to a ventilation system as described above.

Advantageous developments of the invention are given in the dependent claims.

A particularly advantageous development provides for the top layer to comprise an arrangement in layers of a surface layer, a foam layer and a separating layer adjoining the hollow layer.

Here the surface layer serves as the termination relative to the vehicle interior. This layer can be designed in any kind of way, e.g. as a synthetic slush skin, a cast synthetic skin and/or leather or textile materials.

The foam layer here has the task of providing safety for the vehicle occupants or pleasant haptics; the foam layer should be directly connected to the surface layer in the interests of as good a temperature transmission as possible. Various materials suggest themselves for the foam layer. Thus it is possible for example to use conventional polyurethane foam. However it is particularly advantageous to use foam which has good heat-conducting properties and is simultaneously "soft". Here also porous, expanded polyolefin, e.g. polypropylene, suggests itself, which is permeable by gas and thus makes possible a better airflow through the foam layer and therefore a better heat exchange towards the surface layer.

The separating layer adjoining the foam layer can consist of plastics material and/or metal. Here, too, it is advantageous to provide as good a heat transfer from this boundary layer as possible in order thus to be able to transmit the heat from the surface layer particularly well towards the hollow layer. To this end, as a further improvement it is also a good idea for the separating layer to be air-permeable. Here, what is achieved in particular with the above-described porous, air-permeable foam layer is that there is an even better airflow through the surface layer.

The separating layer can be embodied in various ways. Thus it is for example possible for a continuous plastics material or metal separating layer to have perforations which are introduced before or after the separating layer has been connected to the foam layer. Naturally it is also possible to provide separating layers which are perforated from the start. A variant to this provides for the separating layer to have a frame formed from plastics material into which for example metal screens are inserted (naturally also the reverse material pairing is possible.)

It is particularly advantageous that the top and bottom layers are connected by webs which thus define the dimensions of the hollow layer. In addition to this spacing function for the top and bottom layers, these webs in the hollow layer also serve the conduction of air inside the hollow layer. The webs can be integrally connected to the separating layer or integrally connected to the bottom layer and later be glued or welded to the respective other layer. Naturally it is also possible to connect individual web elements or a web frame on both sides with the top and bottom layers.

The hollow layer is connected via supply lines to a ventilation system of the automotive vehicle, preferably an air-conditioning system for the vehicle. The thickness of the hollow layer should be such that the air resistance is not too high. Thus an obvious design is for the hollow layer to extend for 4 mm perpendicular to the wall structure plane in a total thickness of the wall structure of approximately 10 mm. Preferably the thickness of the wall structure (designated with "b" in FIG. 1) is 6–12 mm; the corresponding hollow layer (designated by "a" in FIG. 1) here has a thickness of 3–6mm (this thickness is in each case measured perpendicular to the plane of the wall structure.

The bottom layer adjoining the hollow layer on the other side assumes the actual "support tasks" as they are generally known from conventional control panels. The bottom layer consists preferably of plastics material, wood and/or metal; a possible material is also e.g. a GRP composite material.

In an advantageous development, the bottom layer can be covered on its side pointing away from the hollow layer with an insulating layer, in order thus to seal the wall structure better from external temperature influences, such that direct control of the heat lost from the surface layer is possible by the air flowing through the hollow layer. As the insulating layer is preferably used a metal foil (e.g. aluminium foil); naturally other materials are also possible here.

The wall structure according to the invention suggests itself in particular for control panels of automotive vehicles. Naturally it also has particular suitability for other elements in a vehicle interior, e.g. for a vehicle floor, a vehicle roof, side parts or even an end wall.

With respect to the manufacturing method according to the invention, other advantageous developments are also possible.

In particular it is an obvious idea for the top layer to be formed by filling the area between a surface layer and a separating layer with foam (forming the upper layer), the surface layer and the separating layer being introduced into a foaming tool at a spacing from one another before the foaming process. This guarantees that a particularly good heat conduction from the foam layer to the surface or separating layers is guaranteed, since here there is direct foaming. Then subsequently e.g. also perforation of the separating layer can take place (insofar as this layer was not perforated in advance).

DETAILED DESCIPTION

Figure 1:
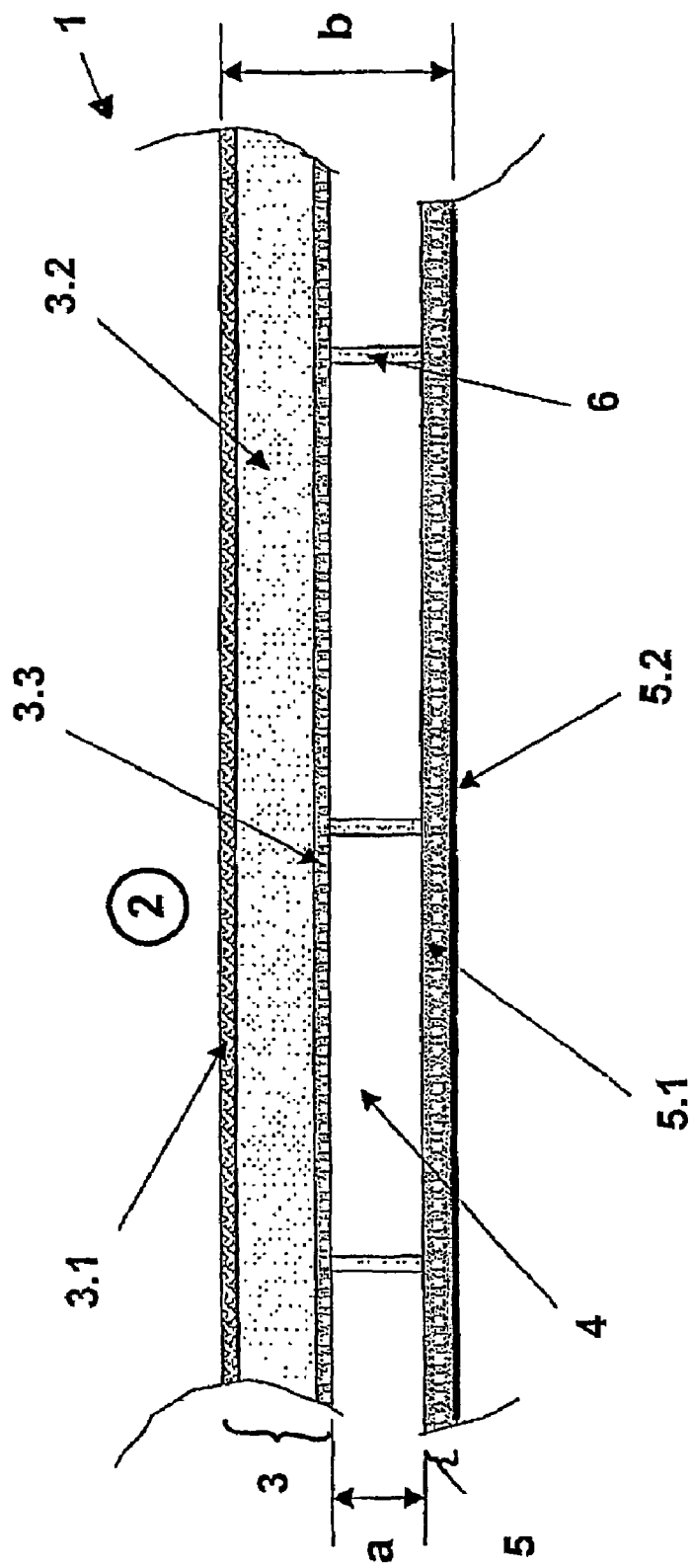
FIG. 1 shows a cross-section through a wall structure according to an exemplary embodiment of the present invention.

FIG. 1 shows a wall structure 1 according to the invention in cross-section. This is a part of a control panel for an automotive vehicle. The wall structure 1 is a lamination comprising a top layer 3, a hollow layer 4 and a bottom layer 5. The top layer 3 is here oriented with its side pointing away from the hollow layer 4 towards the vehicle interior 2. The hollow layer 4 is connected to a ventilation system, not shown, of the automotive vehicle, such that heat energy may be removed from the top layer or supplied to same by means of an airflow which is guided inside the hollow layer.

The top layer 3 comprises a surface layer 3.1, which faces towards the vehicle interior, an adjoining foam layer 3.2 as well as a separating layer 3.3 adjoining the foam layer.

The surface layer 3.1 is embodied as a synthetic slush skin. The foam layer 3.2 is embodied as a polyurethane foam layer. The separating layer 3.3 is a perforated plastics material layer, the perforations being continuous from the hollow layer to the foam layer 3.2 for air exchange. By this means, the heat transfer from the foam layer 3.2 to the hollow layer 4 is further improved. The hollow layer 4 is filled with air and has webs 6 which connect the separating layer 2 to the bottom layer 5. In the present case, these webs are an integral component of the bottom layer 5 and are connected to the separating layer 3.3 by ultrasonic welding. Naturally it is also possible for the webs to be prefabricated as a single frame, or for them to be an integral component of the separating layer and only connected to the bottom layer 5 later.

What is generally sought is that the hollow layer 4 has a uniform expanse generally perpendicular to the wall structure plane, i.e. that the individual layers of the wall structure are substantially parallel in order to achieve as homogenous a supply or removal of heat as possible on the basis of uniform flow conditions. The flow conditions can moreover be influenced by the course of the webs 6. In the present case, the hollow layer has a thickness of 4 mm, whilst the overall wall structure has a thickness of 10 mm.

The bottom layer 5 consists of a plastics material (GRP composite), which is designated by 5.1. Adjoining this layer on the side pointing away from the vehicle interior 2 is an insulating layer 5.2 formed from aluminium foil. Due to this insulating layer, the influence of heat or cold from the side pointing away from the vehicle interior 2 is reduced, such that undisturbed temperature control can take place in the vehicle interior or respectively on the surface layer 3.1 through the ventilation of the hollow layer 4.

Figure 2:
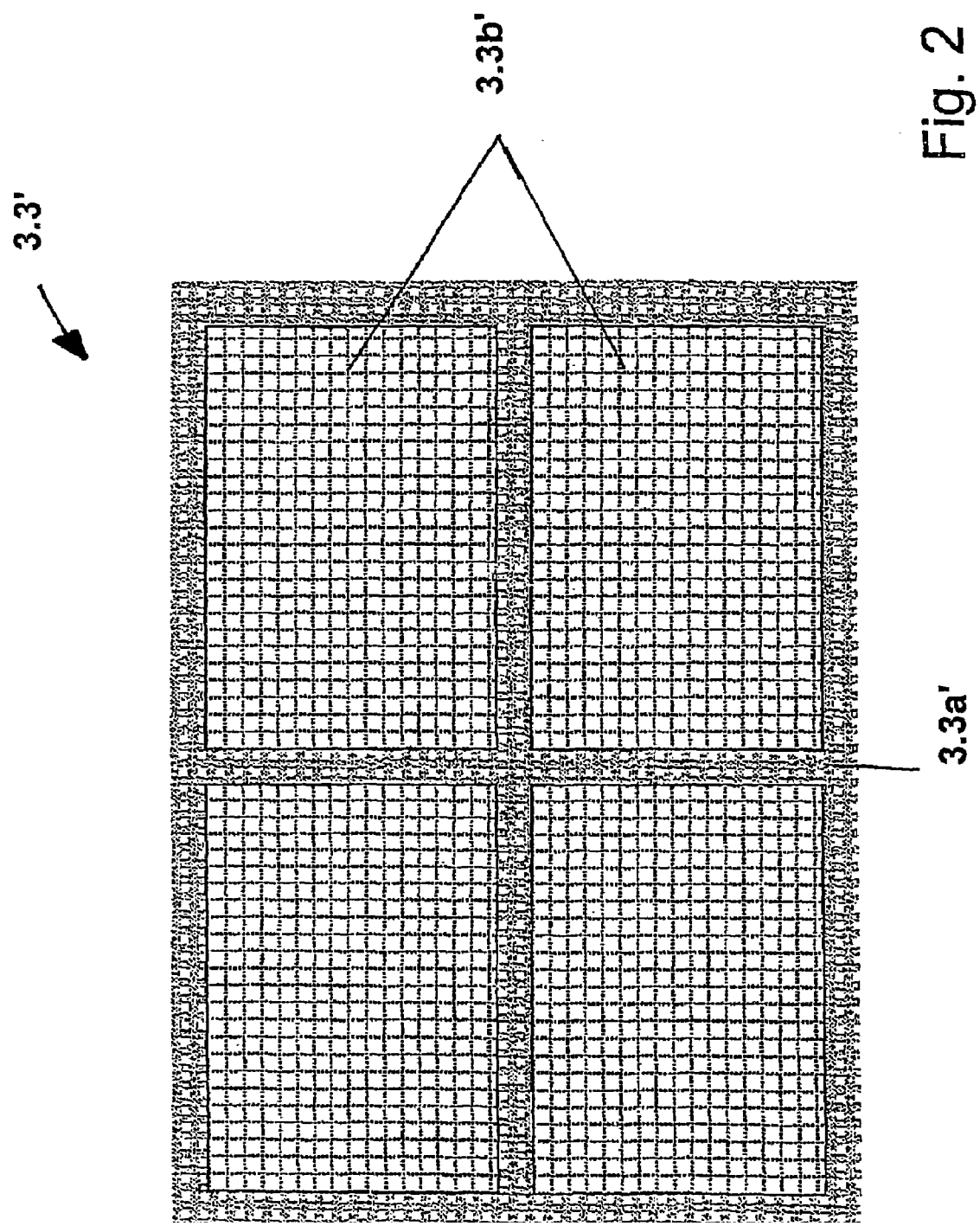
FIG. 2 shows a separating layer according to an exemplary embodiment of the present invention.

FIG. 2 shows an example of a further embodiment of a separating layer 3.3. This is a frame-like arrangement formed from plastics material 3.3 A', into which four metal grids 3.3 B' are inserted which are also air-permeable.

Figure 3:
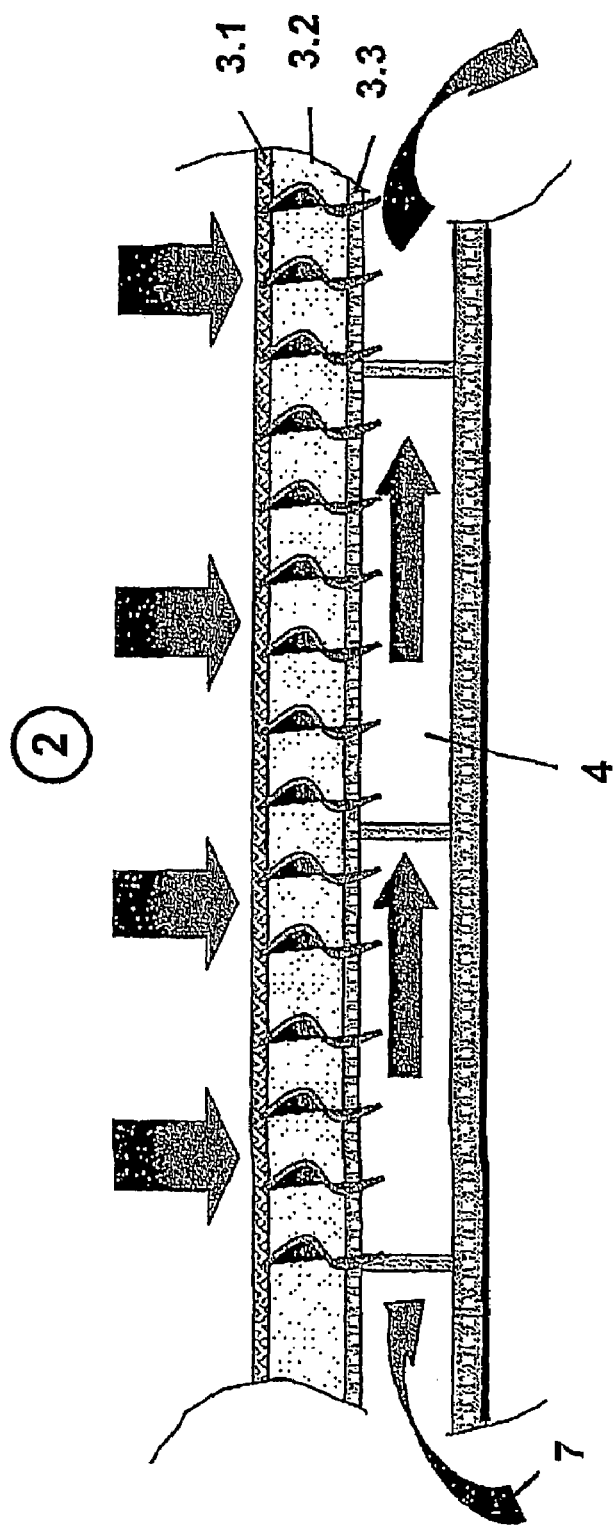
FIG. 3 shows a schematic representation of heat conduction processes inside the wall structure according to an exemplary embodiment of th present invention.

FIG. 3 shows the conditions during dissipation of heat from the vehicle interior 2. Here it is shown how heat guided towards the surface layer 3.1 (represented with four broad arrows which point to 3.1) is initially dissipated into the foam layer 3.2 and from there via the separating layer 3.3 into the hollow layer 4. This takes place by supplying cold air 7 which generates a temperature gradient (dropping from the surface layer 3.1 to the hollow layer 4). In this way, the initially cold air which is guided through the hollow layer heats up; correspondingly, however, the heat is also removed from the vehicle interior 2 or from the surface layer 3.1.

It is obvious that when the temperature gradient is reversed, a "wall structure heating system" can also be provided.

The wall structure 1 is preferably part of a control panel; however it can also be part of a floor, of a roof, of side parts or of an end wall of an automotive vehicle.

For producing the wall structure according to the invention, bottom layer 5 and top layer 3 are usually so interconnected at a spacing from one another that between them a—preferably uniformly thick—hollow layer 4 remains for air conduction. The spacing here comes about due to the webs 6 belonging to the top and/or bottom layers.

In the present case, the top layer 3 was produced first by filling the area between a surface layer 3.1 and a separating layer 3.3 with foam. In this process it was ensured by spacer members that the surface and separating layers were introduced at a spacing from one another into a foaming tool before the foaming process. Then the separating layer 3.2 was provided with perforations which were open as far as the foam layer 3.2. Following this, an already prefabricated bottom layer 3, which had integral webs 6, was welded using ultrasound to the separating layer 3.3 in the region of the ends of the webs pointing away from the bottom layer, and in this way securely connected, thus producing the wall structure 1 according to the invention.

The present invention relates therefore to a wall structure, especially to be used as a control panel for vehicle interiors, said panel comprising a lamination of top layer, hollow layer and bottom layer, the top layer being oriented towards the vehicle interior and the hollow layer being so connected to a ventilation system that heat energy may be removed from or supplied to the top layer by means of the airflow. Here it is an obvious idea for the top layer to comprise a lamination of surface layer, foam layer and a separating layer adjoining the hollow layer. The separating layer is here preferably designed permeable. This means that it can be for example a screen-like layer or a panel perforated with holes. The great advantage of this is that heat transfer from the hollow layer to the vehicle interior is considerably improved by this means, since especially the heat exchange to the preferably porous, air-permeable foam layer is facilitated and thus quite active heating or cooling can take place over a large area not only of the surface of the wall structure on the side of the vehicle interior but also of the entire vehicle interior.

The invention claimed is:

1. A wall structure, comprising:
   a layered arrangement including a top layer, a hollow layer and a bottom layer, the top layer being oriented towards an interior of a vehicle, the hollow layer being oriented towards a ventilation system so that a heat energy is one of (i) removed from and (ii) supplied to the top layer using an air-flow, wherein the top layer includes a surface layer and a separating layer, the separating layer being an air-permeable layer and adjoining the hollow layer.

2. The wall structure of claim 1, wherein the wall structure is a control panel for the interiors of the vehicle.

3. The wall structure of claim 1, wherein the top layer includes a further layered arrangement which has a surface layer, a foam layer and the separating layer.

4. The wall structure of claim 3, wherein the surface layer consists of at least one of a synthetic slush skin, a cast synthetic skin and leather.

5. The wall structure of claim 3, wherein the foam layer consists of a polyurethane foam.

6. The wall structure of claim 1, wherein the separating layer consists of at least one of a plastics material and a metal material.

7. The wall structure of claim 1, wherein the top layer and the bottom layer are connected by webs.

8. The wall structure of claim 1, wherein the bottom layer consists of at least one of a plastics material, a wood material and a metal material.

9. The wall structure of claim 1, wherein the top layer is covered on a side pointing away from the hollow layer, with an insulating layer.

10. The wall structure of claim 1, wherein the ventilation system is an air-conditioning system of the vehicle.

11. The wall structure of claim 1, wherein the wall structure is between 6 and 12 mm thick.

12. The wall structure of claim 1, wherein the wall structure is a part of one of (i) a control panel, (ii) a floor, (iii) a roof, (iv) a side part and (v) an end wall of the vehicle.

13. A method for manufacturing a wall structure which includes a layered arrangement, comprising:
    interconnecting a bottom layer of the arrangement and a top layer of the arrangement at a spacing from one another so that a hollow layer of the arrangement remains between the bottom and top layers for air conduction,
    wherein the top layer is oriented towards an interior of a vehicle, the hollow layer being oriented towards a ventilation system so that a heat energy is one of (i) removed from and (ii) supplied to the top layer using an air-flow, and wherein the top layer includes a surface layer and a separating layer; the separating layer being an air-permeable layer and adjoining the hollow layer.

14. The method of claim 13, wherein the spacing of the bottom and top layers exists due to webs of at least one of the top layer and the bottom layer.

15. The method of claim 13, further comprising:
    filling a region between the surface layer and the separating layer with a foam material to form the top layer; and
    inserting the surface layer and the separating layer into a foaming tool at a spacing from one another before the filling step.

16. The method of claim 13, further comprising:
    perforating the separating layer before the top and bottom layers are joined together.

* * * * *